(No Model.)

H. C. GRANT.
COLLAPSIBLE CONDUIT FOR ELECTRIC RAILWAY CONDUCTORS.

No. 536,076. Patented Mar. 19, 1895.

WITNESSES:
George Baumann
J. C. Connor

INVENTOR
Harry C. Grant
BY
Howson & Howson
his ATTORNEYS.

UNITED STATES PATENT OFFICE.

HARRY C. GRANT, OF NEW YORK, N. Y.

COLLAPSIBLE CONDUIT FOR ELECTRIC-RAILWAY CONDUCTORS.

SPECIFICATION forming part of Letters Patent No. 536,076, dated March 19, 1895.

Application filed September 17, 1894. Serial No. 523,187. (No model.)

*To all whom it may concern:*

Be it known that I, HARRY C. GRANT, a citizen of the United States, and a resident of New York city, New York county, New York, have invented an Improved Electric Railway, of which the following is a specification.

My invention relates to that class of electric railway systems in which the main electrical conductor is inclosed within a casing of which a more or less flexible portion carries electrical contacts throughout its length, which are to be mechanically brought into electrical connection with the internal main conductor by a trolley or other projecting piece upon each car and released from contact again as the car passes along.

The main object of my invention is to so construct an electric railway system of this character as to insure the exclusion of dirt and moisture from the interior of the casing, or prevent such from interfering with the practical operation of the system, to make the casing as durable as possible and yet of simple and economical construction and adapted to operate under all conditions of temperature, weather and traffic.

Figure 1:
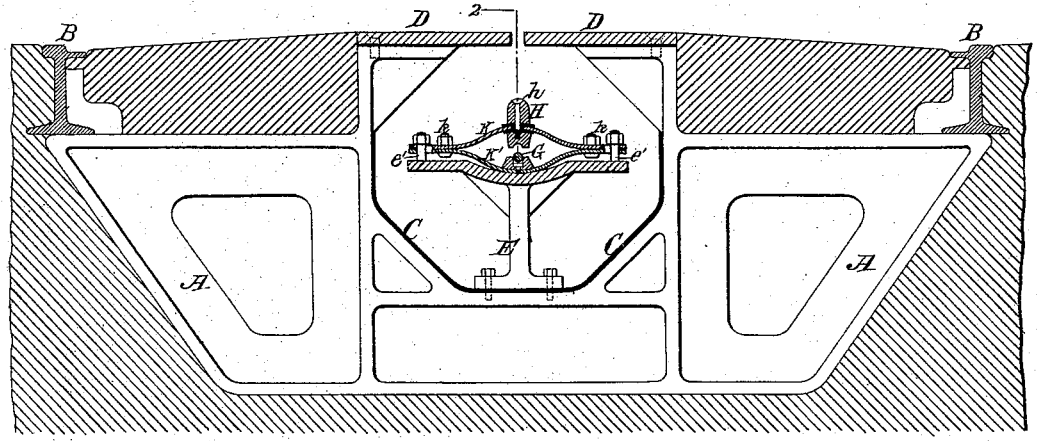
Figure 2:
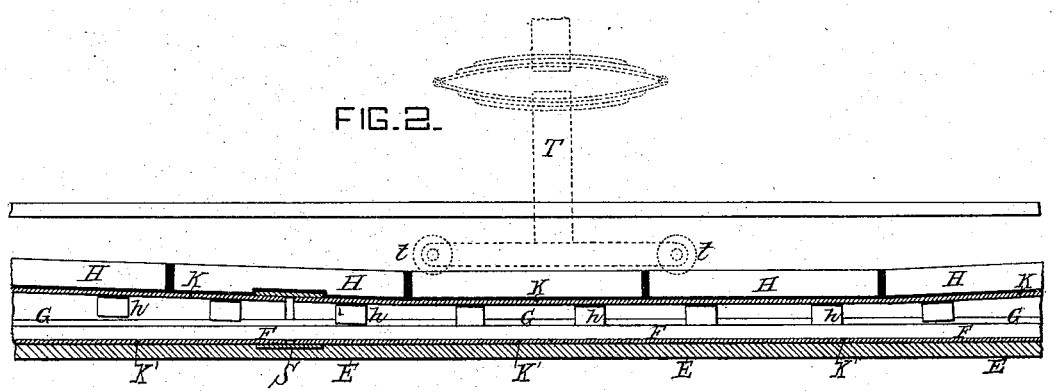

In the accompanying drawings, Figure 1 is a transverse section of an underground conduit system to which my improvements have been applied. Fig. 2 is a longitudinal section on the line 2—2, Fig. 1; and Fig. 3 is a transverse section of the casing inclosing the conductor, and with the adjacent parts, all drawn to a larger scale than Figs. 1 and 2.

It should be understood at the outset that although I have shown my improvements as applied to a specific form of underground conduit, I do not wish to confine myself thereto, as the form shown is illustrated only by way of example.

In Fig. 1, A is one of the girders which are arranged at intervals along the track and support the permanent way rails B B and the conduit C. The plates D D which close in the top of the conduit are preferably made somewhat wider than is common in cable railway systems, in order to make it more convenient to get at and remove the internal casing which carries the electrical conductor.

Figure 3:
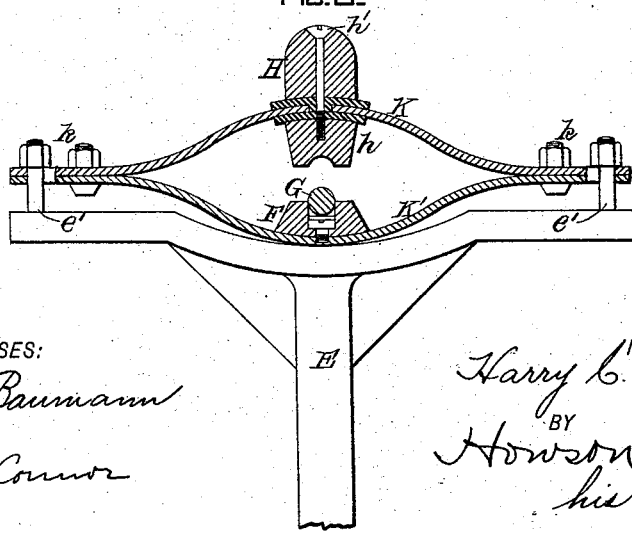

Within the conduit I provide a supporting table E whose upper surface at some distance from the bottom of the conduit may be made partly concave as shown more fully in Fig. 3. Upon this support I mount my longitudinal casing which is to inclose the main electrical conductor. This casing I make of a series of lengths of metal plates, preferably steel, elliptical in cross section. While the several lengths may be made each in one piece, I prefer to make each length of a pair of plates K K' with their concave sides placed face to face, and their outer edges, which are practically straight, bolted or otherwise firmly secured together as at $k$. These pairs of plates are made in suitable lengths joined together by any suitable means, as by a sleeve, as shown at S in Fig. 2, so as to form a practically continuous elastic metal casing upon the support E in the conduit, at a sufficient height above the bottom of the conduit to prevent trouble from dirt, snow or water which might otherwise accumulate under the casing and interfere with its movement.

Upon suitable insulating blocks F secured to the inside of the bottom plate K' of this elastic metallic casing is mounted the continuous main conductor G. To the upper plate K immediately over this conductor there are secured on the outside sectional rails H insulated from the metallic casing and from each other, but electrically connected as by means of bolts $h'$ to contacts $h$ within the inclosing casing immediately over the electrical conductor G.

The car is provided with any suitable contact piece or trolley, such for instance as indicated by dotted lines at T in Fig. 2, and consisting of a frame provided with two contact wheels $t, t,$ electrically connected with the car circuit. These trolley or contact wheels $t$ should be at a distance apart either greater or less than the length of each rail section H, to avoid the breaking of the circuit as these wheels successively pass over the insulations between the rail sections. As the trolley on each car passes along in contact with the rail sections, it will push the contacts $h$ down into electrical connection with the main conductor G to supply current to the car circuit, both plates K and K' of the elastic casing yielding together and tending to straighten out, like an elliptic spring in a vehicle, until the contacts $h$ bear upon the electrical conductor G. As the trolley passes along, the plates K and K', tending by their elasticity to return to their normal shape, will raise the contact pieces h again. By thus making the inclosing casing for the electrical conductor of elastic plates of elliptic cross section, I produce a casing of unusual strength and yet of unusual elasticity, since this latter is distributed over the casing. This casing may be provided with a suitable weather-resisting coating, and the joints along the edges of the pairs of plates may be provided with white lead or any suitable elastic cement or other packing to make a tight joint.

I prefer to provide the cross-heads of the posts E with guide pins e' passing through slots in the outer edges of the casing.

I claim as my invention—

1. An electric railway system having a main conductor, an inclosing casing therefor, composed of lengths of elastic metal plates forming the casing of elliptic cross section and insulated contacts carried by said casing to be brought into electrical connection with the inclosed conductor by a passing car, substantially as described.

2. An electric railway system having a main conductor, an inclosing casing therefor, composed of pairs of elastic plates secured at their edges, and of semi-elliptic cross-section, and contacts carried by said casing to be brought into electrical connection with the inclosed conductor by a passing car, substantially as set forth.

3. An electric railway system having a main conductor and an inclosing casing therefor, composed of pairs of elastic metal plates secured together at their edges, and of semi-elliptic cross-section, insulating supports for the main conductor within said casing, and insulated contacts also carried by the casing, to be brought into electrical connection with the inclosed main conductor by a passing car, substantially as set forth.

4. An electric railway system having an underground conduit with a support therein, a casing composed of elastic metal plates of semi-elliptic cross-section mounted on said support, above the bottom of the conduit, an insulated main conductor within the said casing and contacts also carried by the said casing, to be brought into electrical connection with the inclosed main conductor, by a passing car, substantially as set forth.

In testimony whereof I have signed my name to this specification in the presence of two subscribing witnesses.

HARRY C. GRANT.

Witnesses:
EDITH J. GRISWOLD,
HUBERT HOWSON.